United States Patent [19]

Yamakawa et al.

[11] 4,391,669
[45] Jul. 5, 1983

[54] DEVICE FOR MAKING RECORDING DISC CARTRIDGE

[75] Inventors: Tohru Yamakawa, Muko; Kozi Akiyama, Joyo, both of Japan

[73] Assignee: Hitachi Maxell, Ltd., Osaka, Japan

[21] Appl. No.: 227,982

[22] Filed: Jan. 23, 1981

[30] Foreign Application Priority Data

Jan. 25, 1980 [JP] Japan .................................. 55-7914

[51] Int. Cl.³ .................... B32B 31/00; G05G 15/00; B31F 1/00
[52] U.S. Cl. .................................. 156/539; 156/479; 156/583.4; 156/583.91; 156/359; 156/290; 156/223; 156/513; 493/209
[58] Field of Search ................ 156/70, 155, 216, 273, 156/291, 290, 295, 300, 583.4, 583.91, 223, 467, 468, 475, 479, 364, 530, 359, 538, 539, 513, 583.1; 206/312, 313; 270/44, 43; 229/68 R, 80, 48 SB, 48 T; 282/25; 493/189, 217, 264

[56] References Cited

U.S. PATENT DOCUMENTS

| | | | |
|---|---|---|---|
| 3,627,617 | 12/1971 | Schaumburg | 156/583.1 |
| 3,682,740 | 8/1972 | Newton | 156/291 |
| 3,721,602 | 3/1973 | Bosse | 156/583.3 |
| 3,817,815 | 6/1974 | Sendor et al. | 156/583.4 |
| 3,926,713 | 12/1975 | Lowe et al. | 156/583.1 |

FOREIGN PATENT DOCUMENTS

| | | | |
|---|---|---|---|
| 53-72079 | 6/1978 | Japan | 156/583.1 |
| 800513 | 8/1958 | United Kingdom | 206/313 |

*Primary Examiner*—Edward C. Kimlin
*Assistant Examiner*—Louis Falasco
*Attorney, Agent, or Firm*—Birch, Stewart, Kolasch & Birch

[57] ABSTRACT

This invention is directed to a device for making a magnetic recording disc cartridge having an enclosure composed of a cover sheet with a liner and a recording disc, wherein the liner is preliminarily fixed to the cover sheet by at least two spots to prevent a displacement of the liner from position during the process of making the cartridge.

5 Claims, 11 Drawing Figures

DEVICE FOR MAKING RECORDING DISC CARTRIDGE

BACKGROUND AND SUMMARY OF THE INVENTION

The present invention relates to an improvement of a device for making a magnetic disc cartridge, which is so called a floppy disc, and more particularly to an improvement of a device for adhering a liner sheet to a cover jacket which encloses the floppy disc.

A floppy disc comprises a magnetic disc and a jacket enclosing the magnetic disc. Said jacket is composed of a cover sheet made of a thermal plastic resin material such as polyvinyl chloride and a liner sheet made of a non woven fabric of synthetic fiber of rayon or polypropylene which is attached to the inner face of the cover sheet to stabilize rotation of the magnetic disc.

Conventionally, in the process of manufacturing such a floppy disc, said liner sheet is placed and adhered onto the cover sheet by heat melting adhesion. In this adhesion process, in order to avoid undesired thermal deformation of the liner sheet due to an excessive temperature rise, such a hot melting adhesion must be performed rapidly. However, since the hot melting adhesion is made by passing the liner sheet and the cover sheet between a pair of heat rollers rotating in a high speed during the hot melting adhesion, the liner sheet is apt to be displaced from correct position due to vibration of the heat rollers in addition to vibration occurring during transfer of the liner sheet and the cover sheet. It is noted that the liner sheet is made of a non woven light fabric and is placed on a flat smoothed surface of the cover sheet, the liner sheet can be easily displaced from position by various vibrations as mentioned above.

On the other hand, in the magnetic disc cartridge, the liner sheet must be laid uniformly inside the cover sheet without being folded and overlapped, so that a magnetic disc can rotate smoothly. In a case where the liner sheet is displaced from position in the process of adhesion onto the one surface of the cover sheet, which is in turn formed into a jacket, the liner sheet may partly be folded or undesirably overlapped, thus causing the disc to be prevented from a smooth rotation.

Accordingly, an object of the present invention is to provide a device for making of magnetic disc cartridge which prevents the displacement of the liner sheet from the correct position in the process of adhering the liner sheet onto the cover sheet.

Another object of the present invention is to provide a device for making a magnetic recording disc cartridge wherein a liner sheet is not folded in an undesirable manner during the process of adhesion of the liner to a cover sheet of the cartridge.

A further object of the present invention is to provide a device for making a magnetic recording disc cartridge in accordance with a method of the present invention.

According to the present invention, there is a device for making a magnetic recording disc cartridge having a cover jacket in the form of an enclosure with a drive shaft insertion hole and a recording head access hole defined therein and a magnetic recording disc which is rotatably enclosed in the enclosure, said cover jacket being composed of a cover sheet of a generally elongated rectangular shape with a liner laid on the surface of the cover sheet. The jacket is formed by folding the cover sheet with a liner along a line crossing in a direction along the short side of the cover sheet in such a manner that both portions of the liner positioned on both sides of the folded liner are opposed to each other in the enclosure.

The device comprises a feed table for placing the cover sheet with the liner thereon and first adhering means having a plurality of heating chips for adhering said liner to the cover sheet by heat melting adhesion, the heating chips are vertically movably disposed above the feed table. First transferring means are provided for transferring the cover sheet with the liner from an initial position remote from the first adhering means on the feed table to such a position that the front peripheral edge portion of the liner is placed below the heating chips of the first adhering means. Means for reciprocally moving the heating chips in a vertical direction are provided. The cover sheet with the liner is transferred to such a position that the front peripheral edge portion of the liner is placed below the heating chips of the first adhering means by said first transferring means and in turn the heating chips of the first adhering means are lowered to contact on the liner from above to preliminarily adhere the liner to the cover sheet by a plurality of spots on the front peripheral edge thereof. The device further comprising second adhering means for adhering the liner to the cover sheet by heat melting adhesion around the respective patterns of the drive shaft insertion hole and the recording head access hole, second transferring means for transferring the cover sheet with the liner to a position below the second adhering means after said preliminary adhering is perfected, third adhering means for adhering the liner to the cover sheet by heat melting adhesion over a plurality of predetermined linear patterns on the liner and third transferring means for transferring the cover sheet with the liner from the second adhering means to the third adhering means.

One advantage of the present invention is to prevent a displacement of the liner and the cover sheet from the correct position during the process of making a magnetic recording disc cartridge even if there are various vibrations in the feeding mechanism for transferring the cover sheet with the liner from one process to the subsequent process rapidly, thereby assuring a manufacturing of the magnetic recording disc cartridge without undesired folded portion or overlapped portion of the liner in a cartridge so that smooth rotation of the magnetic recording disc can be obtained.

Other advantage of the present invention is to prevent an undesired separation of the liner from the cover sheet in the peripheral portions around the respective drive shaft insertion holes and the head across holes when they are punched.

BRIEF DESCRIPTION OF THE DRAWINGS

The present invention will be fully described in connection with one preferred embodiment of the present invention with reference to the attached drawings in which.

DETAILED DESCRIPTION OF THE INVENTION

Figure 1:
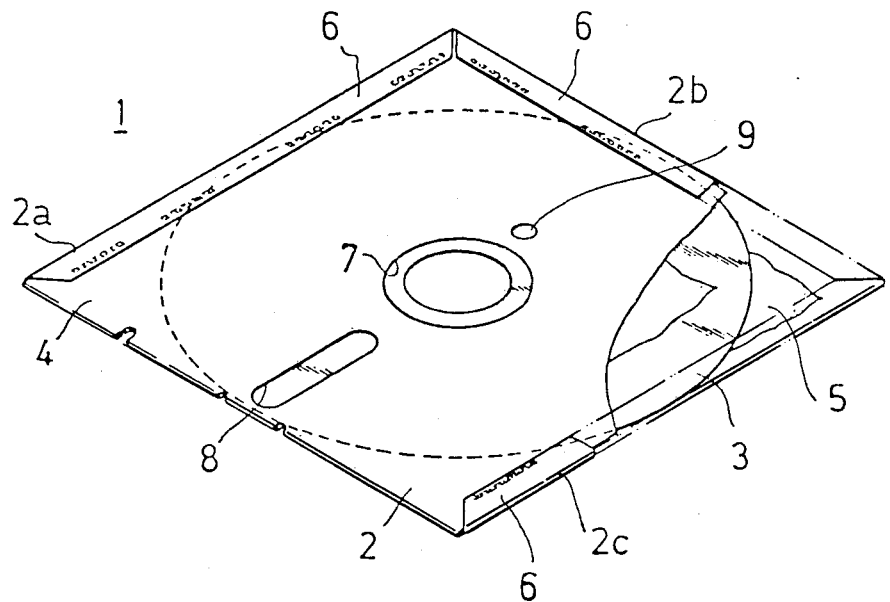
FIG. 1 is a perspective view showing an example of a magnetic recording disc cartridge.

Referring to FIG. 1, there is shown a conventional magnetic recording disc cartridge 1, so called a floppy disc having a cover jacket 2 in which a magnetic disc 3 is rotatably accomodated. Said cover jacket 2 is formed by folding an outer cover sheet 4 made of a flat sheet of vinyl chloride with a sheet of liner 5 of non woven fabric attached on the cover sheet 4. The liner 5 is made of polypropylene or rayon synthetic fibers. Respective peripheral edges 2a, 2b and 2c are closed by folded portions 6 in a known manner.

In the cover jacket 2, there are defined a drive shaft insertion hole (central hole) 7, an elongated head access slot (head window) 8 and an index hole 9.

Figure 2:
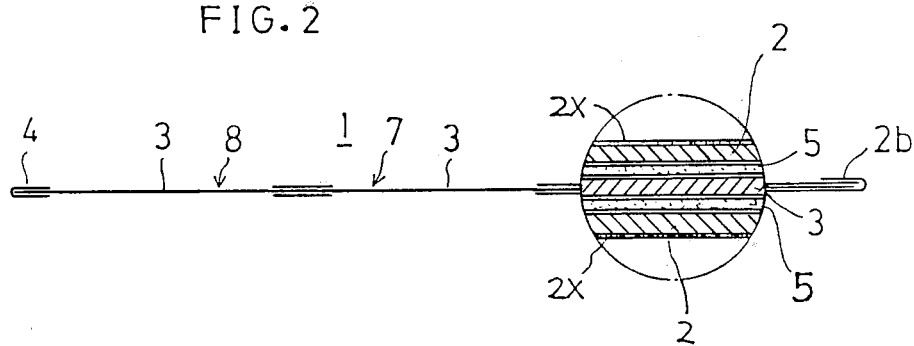
FIG. 2 is a side view of the magnetic recording disc cartridge with an enlarged cross sectional view shown in FIG. 1.

On the both surfaces of the cover jacket, antistatic agent 2X is coated in a known manner as shown in FIG. 2.

Figure 3:
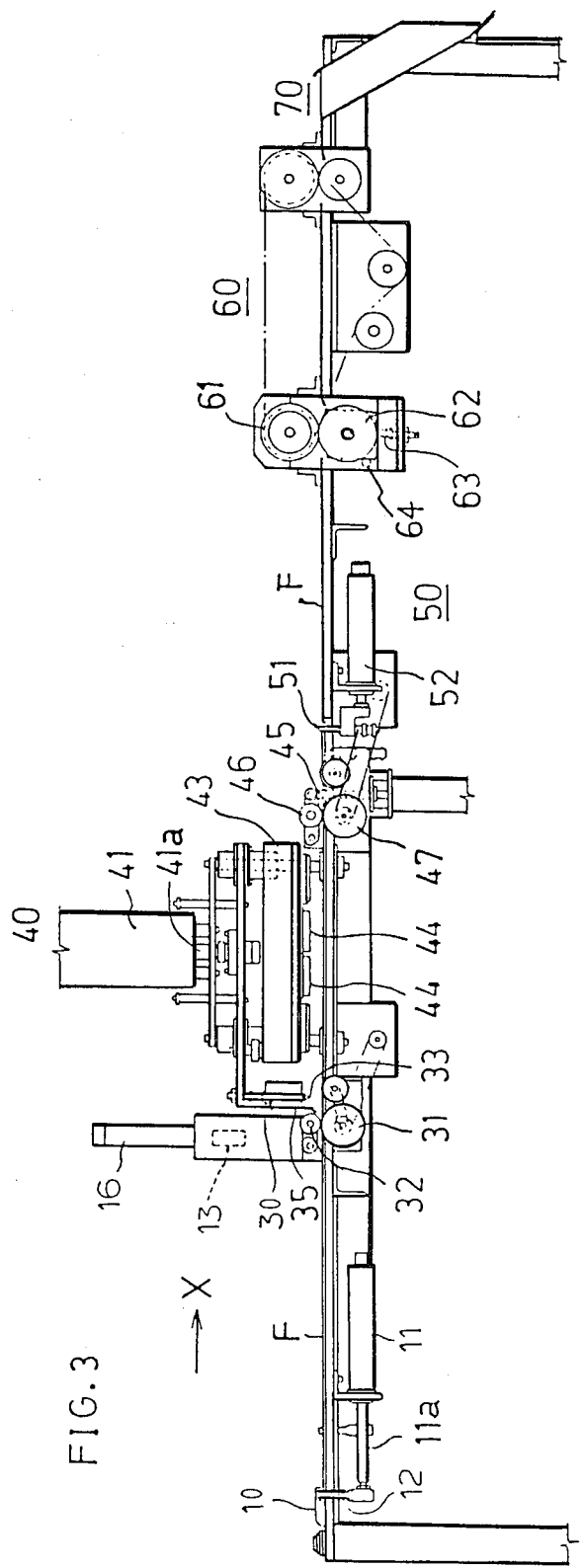
FIG. 3 is a side view of an example of a device for manufacturing a magnetic recording disc cartridge according to the present invention.

FIG. 3 shows a device for adhering the liner 5 onto the cover sheet 2 which is fed in an opened flat state.

At the left end of a feed table F, there is provided a positioning member 10 to determine the start position of the cover sheet 4. A feed actuator 11 is located under the feed table with the piston 11a being moved in a longitudinal direction of the feed table F. An engaging member 12 mounted on the free end of the piston 11a is protruded above the feed table F so that the engaging member 12 can engage with the rear end of the cover sheet 4 to feed the same in the frontward direction X when the piston 11a is pulled in.

A first heat adhesion device 13 is disposed on the feed table F in a given position for preliminarily adhering the liner 5 placed on the upper surface of the cover sheet 4 at the front peripheral edge thereof by a plurality of spots by means of hot melting adhereing device which is explained hereinafter.

Figure 4:
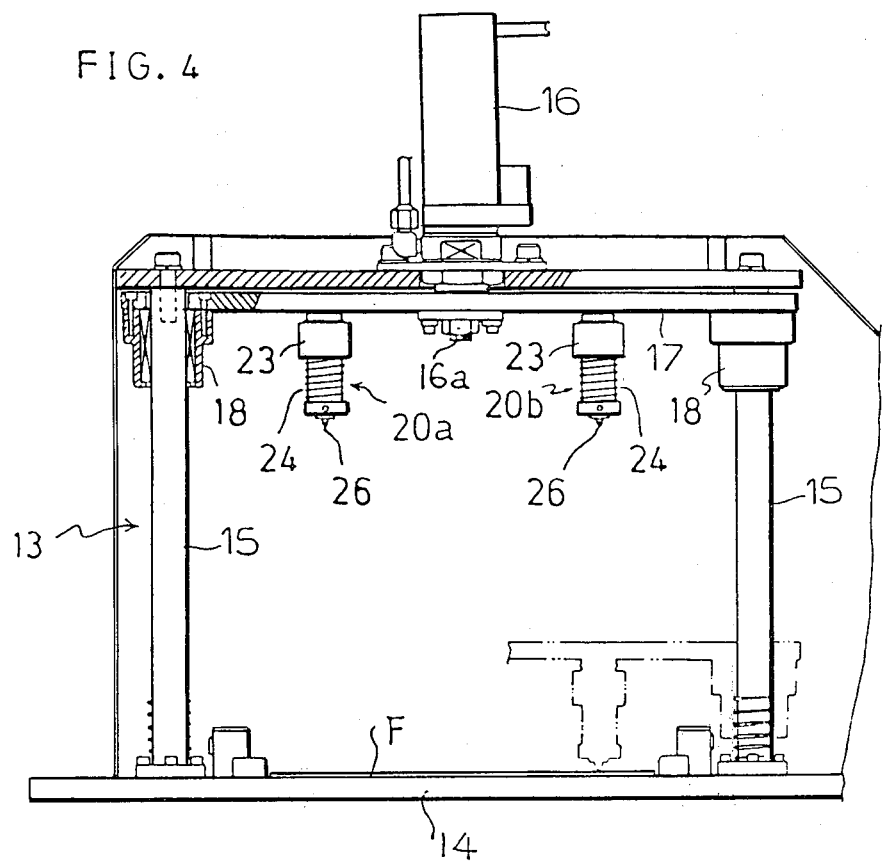
FIG. 4 is a front view of a first heat melting adhesion device employed in the device according to the present invention.

As shown in FIG. 4, a pair of columns 15 stand on the base 14 fixed below and across the feed table F. A movable frame 17 is bridged across the feed table F with the corresponding cylindrical guide members 18 vertically slidably fitted with the columns 15. The movable frame 17 is connected with the piston 16a of a vertical actuator 16 so that the movable frame 17 can be moved vertically in response to the vertical movement of the piston of the vertical actuator 16.

A pair of heat adhesion devices 20a and 20b are mounted under the movable frame 17 with a suitable distance in a direction along the width of the feed table F.

Figure 5:
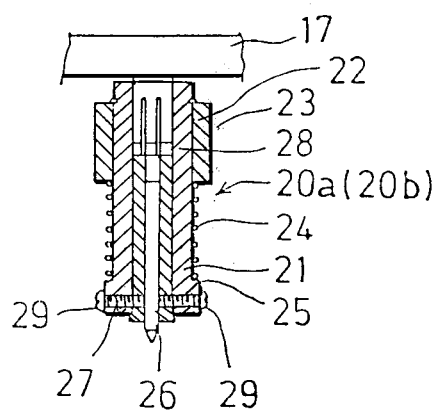
FIG. 5 is a cross sectional view showing a heat adhesion device employed in the device shown in FIG. 4.
Figure 6:
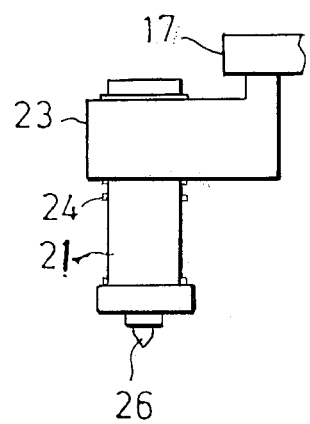
FIG. 6 is a side view of the heat adhesion device shown in FIG. 5.

As shown in FIG. 5, each of the heat adhesion devices 20a and 20b comprises a cylindrical heater holder 21 vertically movably positioned through the corresponding hole 22 defined in a support member 23 which is fixed to the movable frame 17. The heater holder 21 is resiliently biased downwardly by a coil spring 24 engaged between the under surface of the support member 23 and the shoulder 25 of the heater holder 21. A heat adhesion chip 26 surrounded by an electric heater 27 is accomodated within the cylindrical space 28 of the heater holder 21, being fixed thereto by screws 29. By this arrangement, the lower end of the heat adhesion chip 26 can abut resiliently on the surface of the liner 5 by the force of the coil spring 24 when the heat adhesion chip 26 is reached above the feed table by the movement of the frame 17. In a preferred embodiment, the lower end of the heat adhesion chip 26 has a diameter of 0.6 mm and a temperature of 220° C. through 260° C.

Directly after the first adhering device 13, a second adhering device 30 is provided for making preliminary adhesion spots at the rear peripheral edge of the cover sheet 4 and the liner 5.

In order to feed the cover sheet 4 and the liner 5, a pair of feed rollers 31 and 32 are located between the first adhering device 13 and the second heat adhering device 30.

Said second heat adhering device 30 has a plurality of heat adhesion chips 33 heated by corresponding electric heaters (not shown) and the device 30 is fixed to a pattern forming device 40 which acts to adhere the liner 5 with the cover sheet 4 by the respective patterns of drive shaft insertion holes 7 and the head access slots 8.

Figure 8:
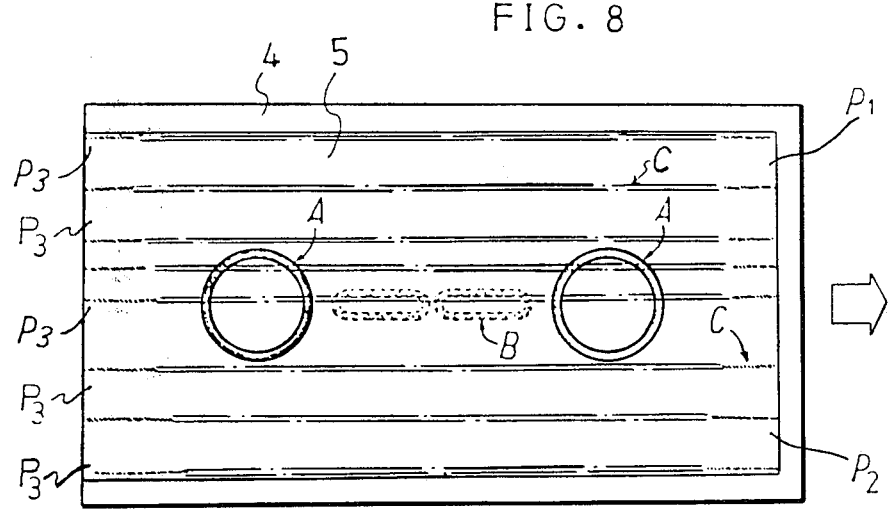
FIG. 8 is a plan view showing the preliminary adhesion spots formed on the liner by the device shown in FIG. 3 with various heat adhesion patterns formed on the liner.

An actuator 50 is provided at the frontward position of the pattern forming device 40 to feed the cover sheet 4 with the liner 5 to a pattern adhesion device 60 which acts to adhere the liner 5 on the cover sheet 4 along the parallel lines C extending in the longitudinal direction of the cover sheet 4 as shown in FIG. 8.

Figure 7:
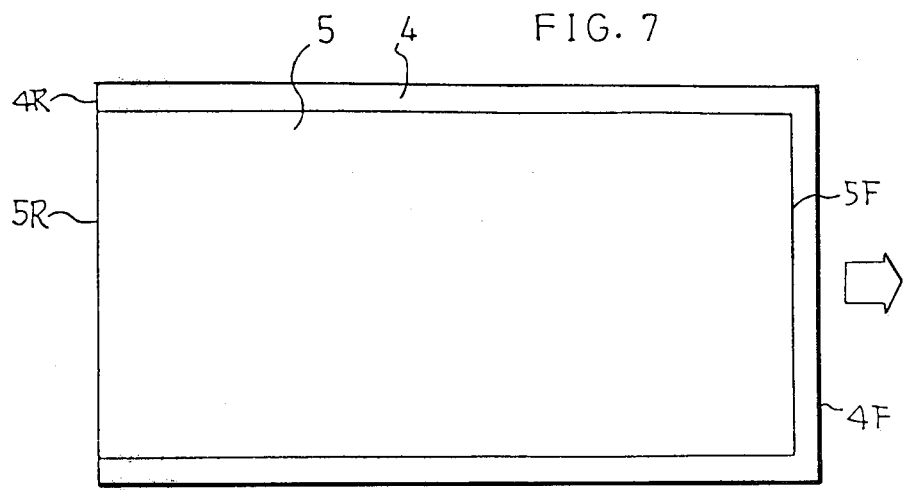
FIG. 7 is a plan view showing a cover sheet with a liner laid thereon in an unfolded state.

In operation, an unfolded cover sheet of generally rectangular shape is placed on the feed table F in such a manner that the rear edge of the cover sheet 4 abuts onto the front face of the positioning member 10. On the surface of the cover sheet 4, a liner 5 which is suitably smaller than the cover sheet 4 is placed in such a manner that the rear edges 5R and 4R of both of the liner 5 and the cover sheet 4 coincide together as shown in FIG. 7.

In turn, the piston of the feed 11 is retracted so that the cover sheet 4 with the liner 5 is advanced frontwardly, namely in a direction of the arrow X by the engaging member 12. When the front edge portion 5F of the liner 5 comes just below the first adhering device 13 where the piston 11a of the feed actuator 11 is fully retracted, a limit switch (not shown) is operated to project the piston of the vertical actuator 16. Then the movable frame 17 with the heat adhesion devices 20a and 20b is lowered along the columns 15, so that the lower ends of both of the heat adhesion chips 26 contact the upper surface of the liner 5 at its front edge portion to heat the liner 5. By this operation, the liner 5 is preliminarily adhered on the surface of the cover sheet 4 at the respective points P1 and P2 as shown in FIG. 8. In this embodiment, each of the heat adhesion chips 26 is adapted to contact on the liner 5 for about 0.5 seconds with a temperature of 220° C.

After the lapse of the period of time of 0.5 seconds, the piston 16a is retracted so that the movable frame 17 with the heat adhesion devices 20a and 20b returns to the original position. This operation can be performed within about 1 to 2 seconds.

As both of the heat adhesion chips 26 contact resiliently on the surface of the liner 5 due to the resiliency of the coil spring 24, both of the heat adhesion chips 26 can contact perfectly uniformly on the liner 5 to assure complete adhesion between the liner 5 and the cover sheet 4.

After the preliminary adhesion of the liner 5 is completed, the feed rollers 31 and 32 are rotated to feed the cover sheet 4 with the liner 5 thus fixed frontwardly on the feed table F. When the front edge 4F of the cover sheet 4 is engaged with the stopper 45 which is protruded from the upper face of the feed table F, the rear edge portion of the cover sheet 4 reaches just below the second adhering device 30 and the intermediate portion of the cover sheet 4 with the liner 5 comes below the pattern forming device 40.

Then the actuator 41 starts to protrude the piston 41a causing the heat adhesion chips 33 and the pattern heat adhesion members 44 to move downwardly. Thus, the heat adhesion chips 33 contact on the liner 5 to adhere the liner 5 on the cover sheet 4 at the several points P3 on the rear edge portion of the cover sheet 4. Simultaneously, on the respective peripheral edges of the patterns A and B as shown in FIG. 8, the liner 5 and the cover sheet 4 are adhered.

In this embodiment, there are provided five adhering devices for adhering the rear edges of the liner 5 and the cover sheet 4, and as shown in FIG. 3, each of the adhering devices 30 is provided with a generally U shaped resilient plate 35, the bent end of which is adapted to press the upper surface of the liner 5 at the position adjacent to the corresponding adhering device 30 so that the liner 5 is not separated from the cover sheet 4, thereby assuring strong adhesion between the liner 5 and the cover sheet 4.

When the piston of the actuator 41 is protruded as mentioned above, the frame 43 is moved downwardly to contact the lower face of the pattern heat adhesion members 44 each having an annular heated member (not shown), so that adhesion of each of the patterns A and B (FIG. 8) can be performed.

After adhesion of the patterns A and B, the stopper 45 is retracted below the feed table F and the pressure rollers 46 are moved downwardly to clamp the cover sheet 4 with the liner 5 between the pressure rollers 46 and the rollers 47 to feed them frontwardly by rotation of the pressure rollers 46 and the receiving rollers 47. During this operation, a pushing member 51 is retracted below the feed table F, and when the rear edge of the cover sheet 4 is past the position, the pushing member 51 is protruded above the feed table F, and the piston of the actuator 52 is retracted to push the rear edge of the cover sheet 4 to feed the same frontwardly.

Thus, the front edge of the cover sheet 4 is fed between the pair of feeding rollers 61 of the line pattern adhesion device 60 when the piston of the actuator 52 is fully retracted.

The line pattern adhesion device 60 comprises a plurality of upper rollers 61 for adhering the liner 5 onto the cover sheet 4 in the form of linear patterns C as shown in FIG. 8 and the corresponding lower rollers 62 which are hollow rollers rotating freely and are biased in an upward direction by means of springs 63 so that each of the lower rollers 62 is pressed to the upper rollers 61. Said upper rollers 61 are respectively heated by means of electric heaters (not shown) up to a suitable temperature such as 220° C. in a known manner.

In order to feed a cooling air into the hollow space of the lower rollers 62, there is provided a forced air cooling device 64. When the cover sheet 4 with the liner 5 is fed between the lower rollers 62 and the upper rollers 61, the liner 5 is adhered by the heat of the upper rollers 61 along the plurality of lines C extending in a longitudinal direction of the cover sheet 4 as the cover sheet 4 is advanced between the rollers 61 and 62.

It is preferred to provide a flexible film such as polyester film coated around the surface of each of the lower rollers 62 to prevent either the diminishing of the frosted surface of the cover sheet 4 and breakage of the liner 5.

The cover sheet 4 to which the liner 5 has been adhered by the respective processes as described above is fed to the chute 70 by passing the cover sheet 4 with the liner 5 between a pair of driving rollers 65a and pinch rollers 65b rotating in synchronism with the upper rollers 61.

Figure 9:
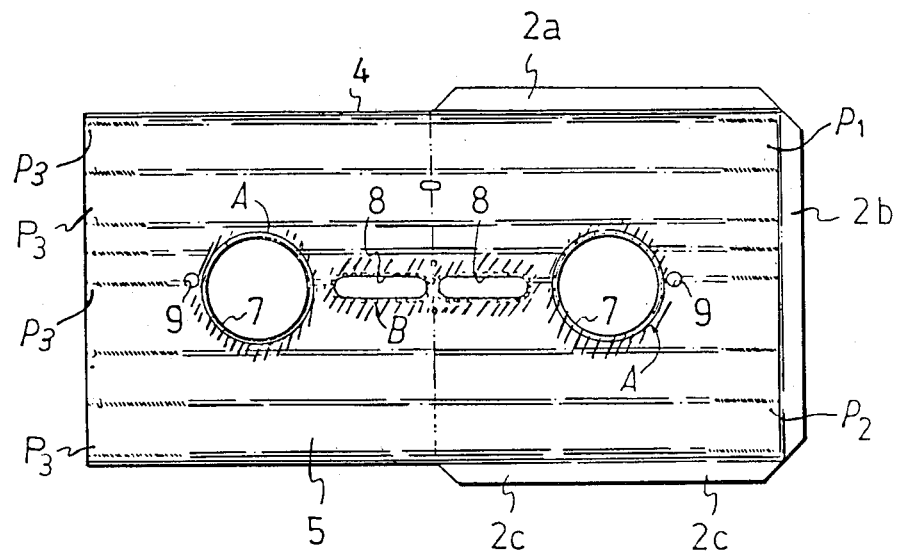
FIG. 9 is a plan view showing the intermediate production of a magnetic recording disc cartridge obtained by the punch process performed by the device shown in FIG. 3.
Figure 10:
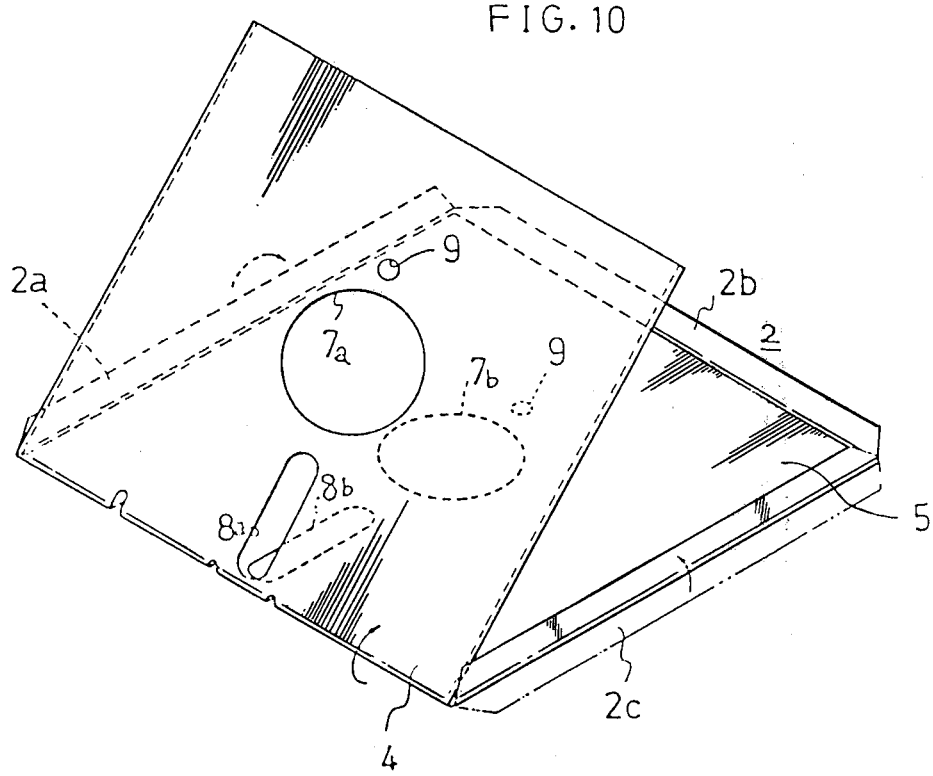
FIG. 10 is a perspective view showing an intermediate state of forming a cover jacket.
Figure 11:
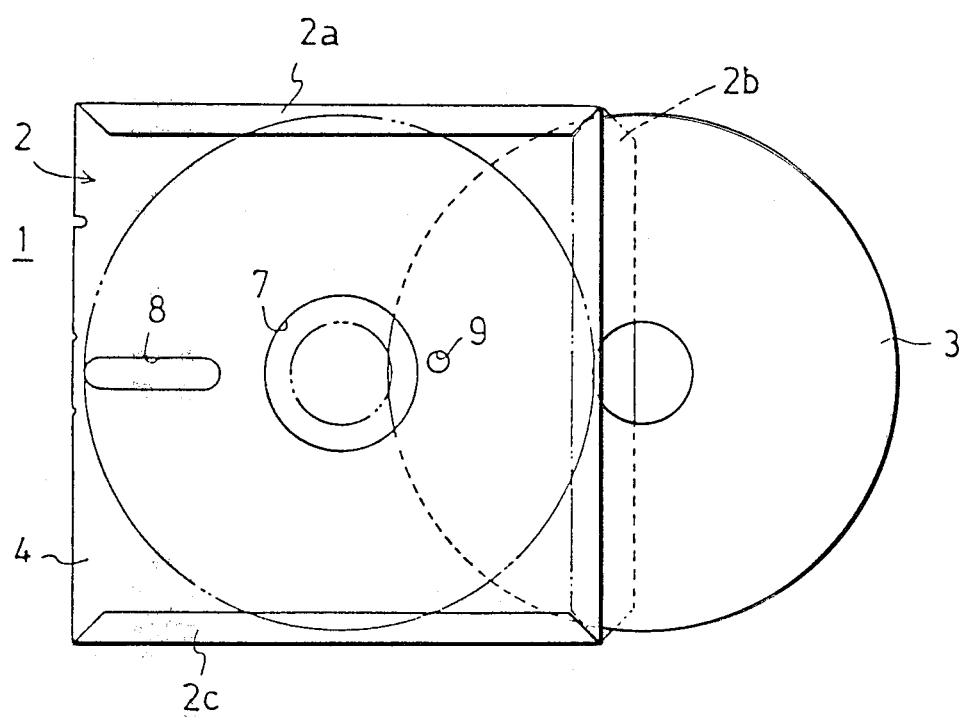
FIG. 11 is a plan view showing a way of assembling a magnetic recording disc and a cover jacket.

The discharged cover sheet 4 with the liner 5 is fed to the subsequent punching process to define the various holes 7 and slots 8 as shown in FIG. 9. Subsequently the cover sheet with the liner 5 formed into the intermediate production of a cover jacket is folded along the center line in such a manner that each of the pair of holes 7a and 7b and the slots 8a and 8b coincide together and the respective peripheral edges 2a and 2c are folded and overlapped on the cover sheet 4 as shown in FIG. 10, in turn the peripheral edges 2a and 2c are adhered on the cover sheet by heat melting adhesion. A magnetic recording disc 3 is positioned inside the cover jacket 2, then the peripheral edge 2b is folded and adhered on the cover sheet 4 so as to enclose the magnetic recording disc 3 in the cover jacket in position in the known manner. Then a floppy disc 1 as shown in FIG. 1 can be manufactured.

It is noted that in order to provide an overall adherence of the liner to the cover sheet, various patterns such as a number of dots located in a suitable distance can be used in place of the linear pattern C mentioned in the embodiment. In addition, such adhesion can be performed by pressing the liner and the cover sheet in one time by a press machine or by passing the cover sheet with the liner between a pair of heat rollers on the surface of which a number of dots are embossed.

In a case where the pattern formed by dots is used for adhering the liner to the cover sheet, other adhesion patterns such as an annular shape adhesion surrounding the drive shaft insertion hole or an elongated oval shape for a head access hole can be performed simultaneously by a press machine or a pair of heat rollers.

What is claimed is:

1. A device for making a magnetic recording disc cartridge having a cover jacket in the form of an enclosure with a drive shaft insertion hole and a recording heat access hole defined therein and a magnetic recording disc which is rotatably enclosed in the enclosure, said cover jacket being composed of a cover sheet of a generally elongated rectangular shape with a liner laid on the surface of the cover sheet, said jacket being formed by folding the cover sheet with a liner along a line crossing in a direction of the short side of the cover sheet in such a manner that both portions of the liner positioned on both sides of the folded liner are opposed to each other in the enclosure, said device comprising;
- a feed table for placing the cover sheet with the liner thereon;
- first adhering means having a plurality of heating chips for adhering said liner to the cover sheet by heat melting adhesion, said heating chips being vertically movably disposed above the feed table;
- first transferring means for transferring the cover sheet with the liner from an initial position remote from the first adhering means on the feed table to such a position that a front peripheral edge portion of the liner is placed below the heating chips of the first adhering means;
- means for reciprocably moving the heating chips in a vertical direction, whereby said cover sheet with the liner is transferred to such a position that the front peripheral edge portion of the liner is placed below the heating chips of the first adhering means by said first transferring means and in turn the heating chips of the first adhering means are lowered to contact on the liner from above to preliminarily adhere the liner to the cover sheet by a plurality of spots on the front peripheral edge thereof;
- second adhering means for adhering the liner to the cover sheet by heat melting adhesion around the respective patterns of the drive shaft insertion hole and the recording head access hole, said second adhering means including a plurality of heating chips for adhering the liner on the cover sheet on a rear peripheral edge of the liner, said adhering of the respective patterns of the drive shaft insertion hole and the recording head access hole and the adhering of the rear peripheral edge of the liner on the cover being performed simultaneously;
- second transferring means for transferring the cover sheet with the liner to a position below the second adhering means after said preliminary adhering is perfected;
- third adhering means for adhering the liner to the cover sheet by heat melting adhesion over a plurality of predetermined linear patterns on the liner; and
- third transferring means for transferring the cover sheet with the liner from the second adhering means to the third adhering means.

2. A device according to claim 1, wherein said plurality of heating chips are mounted on a movable frame mounted across the feed table on a pair of columns standing on the both sides of the feed table.

3. A device according to claim 1, wherein said first transferring means is an air cylinder.

4. A device according to claim 1, wherein each of said plurality of heating chips are resiliently biased in a downward direction by a coil spring.

5. A device according to claim 1, wherein said first adhering means includes a cylindrical heater holder vertically movably positioned through a retaining holder affixed to a support member being affixed to a movable frame.

* * * * *